(12) United States Patent
Markwart et al.

(10) Patent No.: US 11,323,888 B2
(45) Date of Patent: May 3, 2022

(54) SPECTRUM SHARING ADAPTATION FUNCTION

(71) Applicant: NOKIA TECHNOLOGIES OY, Espoo (FI)

(72) Inventors: Christian Markwart, Munich (DE); Rauno Tapani Ruismaki, Helsinki (FI); Mikko Aleksi Uusitalo, Helsinki (FI); Athul Prasad, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/756,643

(22) PCT Filed: Oct. 16, 2017

(86) PCT No.: PCT/EP2017/076331
§ 371 (c)(1),
(2) Date: Apr. 16, 2020

(87) PCT Pub. No.: WO2019/076428
PCT Pub. Date: Apr. 25, 2019

(65) Prior Publication Data
US 2020/0260291 A1    Aug. 13, 2020

(51) Int. Cl.
*H04W 16/14* (2009.01)
*H04L 67/562* (2022.01)
*H04W 12/06* (2021.01)

(52) U.S. Cl.
CPC ......... *H04W 16/14* (2013.01); *H04L 67/2809* (2013.01); *H04W 12/06* (2013.01)

(58) Field of Classification Search
CPC ... H04W 72/082; H04W 72/10; H04W 28/26; H04W 72/0446; H04W 16/14
See application file for complete search history.

(56) References Cited

U.S. PATENT DOCUMENTS

| | | | | |
|---|---|---|---|---|
| 9,516,549 B1 * | 12/2016 | Aksu | ............... | H04W 72/0453 |
| 2015/0230255 A1 * | 8/2015 | Lopes | ............... | H04W 72/0453 370/329 |

(Continued)

FOREIGN PATENT DOCUMENTS

WO    WO 2016/114905 A1    7/2016

OTHER PUBLICATIONS

International Search Report and Written Opinion dated Jun. 15, 2018 corresponding to International Patent Application No. PCT/EP2017/076331.

(Continued)

*Primary Examiner* — Dai Phuong
(74) *Attorney, Agent, or Firm* — Squire Patton Boggs (US) LLP

(57) ABSTRACT

This document discloses a solution for performing spectrum allocations. According to an aspect, there is provided a method comprising: performing, by a spectrum sharing adaptation system, allocation and transmission authorization of a shared spectrum resource to a network element of a communication network, wherein the shared spectrum resource is on frequencies not exclusively licensed to the communication network, and wherein the spectrum sharing adaptation system allocates the shared spectrum resource to the network element by using a first spectrum sharing protocol; acquiring, by the spectrum sharing adaptation system, allocation and transmission authorization of the shared spectrum resource from a spectrum resource manager managing utilization of spectrum resources, wherein the spectrum sharing adaptation system acquires the allocation of the shared spectrum resource by using a second spectrum sharing protocol different from the first spectrum sharing protocol; and performing, by the spectrum sharing adapta- (Continued)

tion system, adaptation between the first spectrum sharing protocol and the second spectrum sharing protocol.

19 Claims, 6 Drawing Sheets

(56) References Cited

U.S. PATENT DOCUMENTS

| | | | |
|---|---|---|---|
| 2017/0295578 A1* | 10/2017 | Khoshnevisan | H04W 72/082 |
| 2017/0318470 A1* | 11/2017 | Srikanteswara | H04W 16/14 |
| 2018/0263042 A1* | 9/2018 | Montojo | H04W 72/10 |
| 2019/0021011 A1* | 1/2019 | Zhang | H04W 72/0453 |

OTHER PUBLICATIONS

Marko Palola et al: "Field trial of the 3.5 GHz citizens broadband radio service governed by a spectrum access system (SAS)," 2017 IEEE International Symposium on Dynamic Spectrum Access Networks (DYSPAN), IEEE, Mar. 6, 2017, pp. 1-9, XP033093996.

* cited by examiner

SPECTRUM SHARING ADAPTATION FUNCTION

FIELD

The invention relates to sharing communication frequencies of a primary user to other users such as mobile communication networks and, in particular, to an adaptation function to implement the sharing.

BACKGROUND

Radio Access Networks (RAN) including a network of (macro, pico and femto) base stations are enabled to use shared spectrum resources according to a defined sharing method. Licensed Shared Access (LSA) and Citizens Broadband Radio Service (CBRS) are typical examples for standardized sharing methods, where an external management entity decides, based on defined sharing rules, a spectrum resource provided to a requesting mobile network entity. The shared spectrum resource is typically owned by and licensed to an incumbent (primary) user, who allows other operators to use the spectrum resource. Each spectrum resource is typically defined by a frequency range, a location where this frequency range is used, and a time frame when the spectrum is used. In addition to the traditional exclusive spectrum assignment, spectrum sharing is a method where spectrum resources may no longer be exclusively assigned to a single operator but jointly assigned to several operators with the obligation to use it collectively.

LSA and CBRS are designed to support dynamic sharing of Spectrum Resources. While static sharing has no time dependencies and the mobile network is allowed to use the spectrum similar to dedicated licensed spectrum, dynamic sharing provides flexible controlling of the shared spectrum resources via a management entity, e.g. LSA Repository (LR) or Spectrum Access System (SAS).

Base stations of the mobile network form a radio access network where the shared spectrum resource is used. A spectrum resource manager translates respective radio constraints protecting the primary users to configuration information and transmits the configuration information to one or more of the base stations. The configuration information may allow or forbid the one or more of the base stations to activate the transmitter to use the shared spectrum resource and to steer the transmission of the terminal devices in the shared spectrum resource.

A variety of challenges and problems arise from the fact that the there exists several spectrum sharing protocols such as the LSA and CBRS. Regulators of different countries or regions may decide to favor different sharing methods, e.g. in Europe the LSA method is preferred while in the USA CBRS method is preferred. Consequently, mobile networks vendors must support and implement multiple sharing protocols for different countries. As an example, an LSA1 interface protocol for sharing via the LSA method and a Citizens Broadband Service Device—Spectrum Access System (CBSD-SAS) interface protocol for sharing via the CBRS method. This means higher product costs and additional efforts, especially when further sharing methods such as mutual renting enter the market.

BRIEF DESCRIPTION OF THE INVENTION

The invention is defined by the subject-matter of the independent claims. Embodiments are defined in the dependent claims.

LIST OF DRAWINGS

In the following, the invention will be described in greater detail with reference to the embodiments and the accompanying drawings, in which FIG. 1 illustrates a system to which embodiments of the invention may be applied;

DESCRIPTION OF EMBODIMENTS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a mobile fixed communication network (MFCN), such as in at least one of the following: Global System for Mobile Communications (GSM) or any other second generation cellular communication system, Universal Mobile Telecommunication System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G) mobile or cellular communication system.

Figure 1:
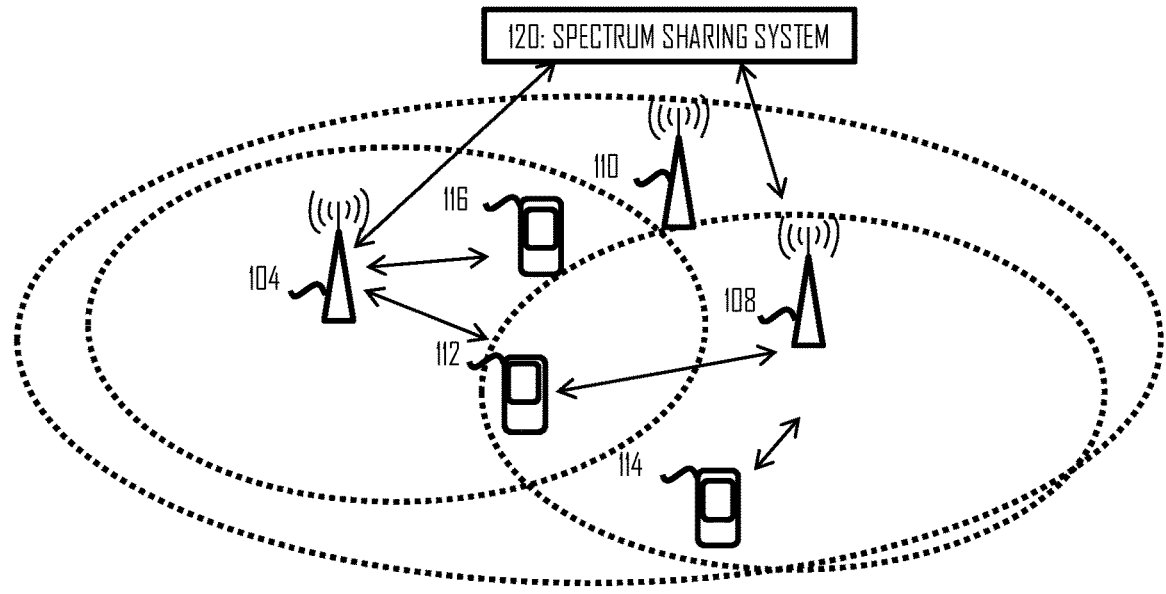

FIG. 1 illustrates an example of a wireless communication system to which some embodiments of the invention may be applied. Referring to FIG. 1, a MFCN may be located in a coverage area of a primary user or a primary system and configured to operate, at least partly, on frequency channels of the primary system that are currently free in the geographical coverage area of the MFCN. The primary system may be a television (TV) broadcast system comprising a broadcast tower 110 broadcasting television channels on some channels of the common frequency band, or it may be a wireless microphone system, or it may be a rentable license spectrum owned by a primary user. The primary user or the primary system may be any entity or user having a priority over the MFCN to occupy the frequency channels. The MFCN may have secondary access to the frequency channels of the primary system, which means that the MFCN must operate under the rules specified by current operational parameters of the primary system so as not to interfere with the operation of the primary system or other users of the frequency spectrum. For example, the Federal Communications Commission (FCC) in the United States has issued a report and order (R&O) which permits the use of TV white space (TV WS) spectrum. White space is the term used by the FCC for a TV spectrum which is not being occupied for primary usage e.g. by the TV or wireless microphone transmitters at a given time in a given geographical area. The BSSs forming the secondary system may be configured to utilize available frequency bands of such a spectrum having a frequency band on a very high frequency band (VHF, 30 to 300 MHz), ultra-high frequency band (UHF, 300 to 3000 MHz), and/or other frequency bands. With respect to the networks of the secondary system, the operation of the BSSs may be based on upcoming IEEE 802.11af specification being developed for TV WS band operation, but the system may in some embodiments be based on another specification, e.g. another IEEE 802.11-based network (e.g. IEEE 802.11n, or 802.11ac), Universal Mobile Telecommunication System (UMTS) or any one of its evolution versions (e.g. long-term evolution, LTE, or LTE-Advanced), a 5G system, a system based on International Mobile Telecommunication (IMT) standard or any one of its evolution versions (e.g. IMT-Advanced), Worldwide Interoperability for Microwave Access (WiMAX), etc. However, the secondary system is not limited to these examples and it may be any other wireless network within the scope of the present claims. The primary system also need not be a TV broadcast or a wireless microphone transmitter system, and it may be any other system having a frequency band that may be shared with the secondary system. The frequencies may also be available without any assigned primary user, e.g. their utilization may be based on cognitive radio access schemes.

In some embodiments, the primary system has a priority over the frequency bands. The secondary system, e.g. each BSS, may then be configured to dynamically adapt to the spectrum utilization of the primary system and occupy a frequency band not used by the primary system in a given geographical area. In such embodiments, there may be rules for the secondary system to ensure minimization/lack of interference towards the primary system, and these rules may require access to information on free frequency bands in each geographical area and/or sensing and use of specified maximum transmit power levels. Such information on the free frequency bands may be managed by a spectrum sharing system 120 to which the access points 104, 108 of the MFCN have access either directly or through an interworking apparatus (not shown) controlling operation of the access nodes in a given area. The spectrum sharing system may manage a database storing information on available spectrum resources and, in some cases, maximum transmit power limits that transmitters of the MFCN may not exceed so as not to interfere with the users of the primary system.

An operator of the primary system or an authority like a regulator may update the database as the channel allocation of the primary system changes, and the spectrum sharing system 120 may reconfigure the MFCN regarding the utilization of the spectrum resources of the primary system accordingly.

The system may comprise access nodes 104, 108 providing and managing respective cells. A cell may be a macro cell, a micro cell, femto cell, or a pico cell, for example. From another point of view, the cell may define a coverage area or a service area of the access node. The access nodes 104, 108 may each be an evolved Node B (eNB) as in the LTE and LTE-A, an access point of an IEEE 802.11-based network (Wi-Fi or wireless local area network, WLAN), or any other apparatus capable of controlling radio communication and managing radio resources within a cell. For 5G solutions, the implementation may be similar to LTE-A, as described above. The access node may equally be called a base station or a network node. The system may be a wireless communication system composed of a radio access network of access nodes, each controlling a respective cell or cells. The access nodes may provide terminal devices (UEs) 112, 114, 116 with wireless access to other networks such as the Internet. The spectrum sharing system may provide the parameters for accessing the spectrum resources of the primary system, and the access nodes 104, 108 may accordingly control transmissions of the terminal devices 112 to 116 such that the transmissions meet the requirements specified by the spectrum sharing system.

The number of access nodes in the system may be very high, e.g. from hundreds to tens of thousands of access nodes, which is typical for operators providing services throughout a country or a state. Also, new spectrum sharing protocols are being developed. Examples of current spectrum sharing protocols include Licensed Shared Access (LSA) developed in Europe, Citizens Broadband Radio Service (CBRS) preferred in the USA, and mutual renting also called co-primary sharing. As the number of spectrum sharing protocols increases, it becomes a problem for the MFCN manufacturers to provide support for the different spectrum sharing protocols in their access nodes.

Figure 2:
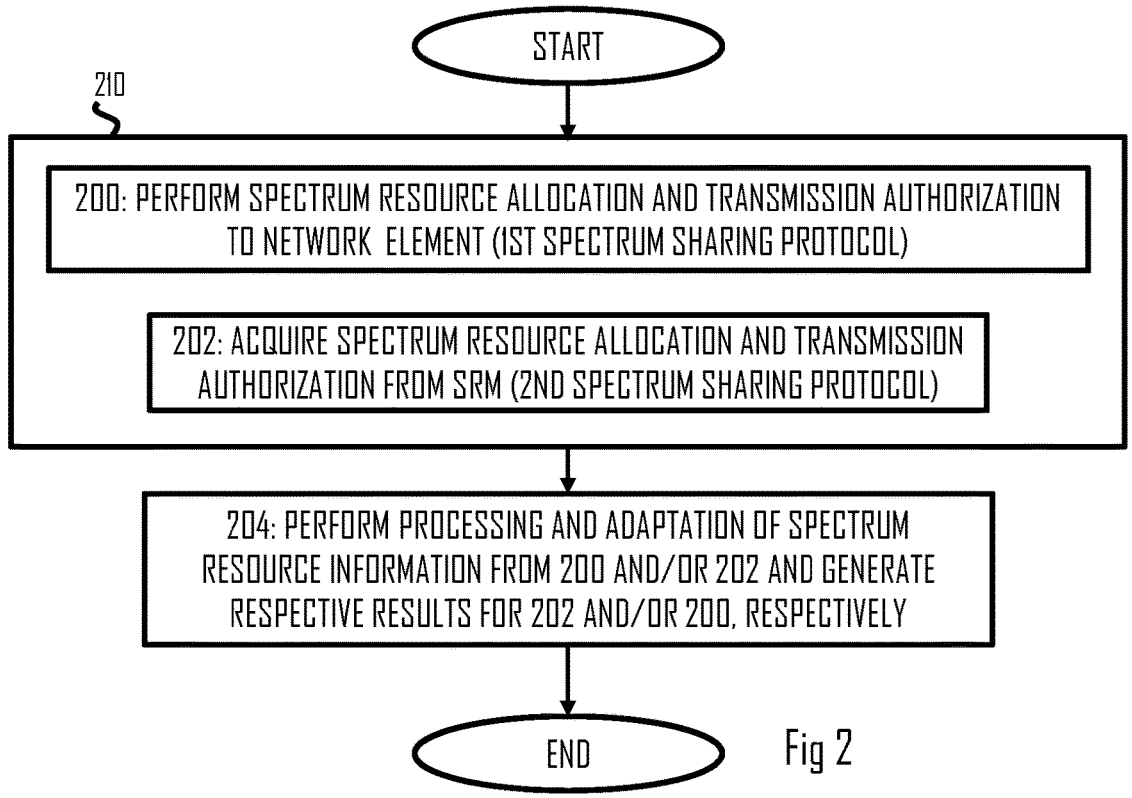
FIG. 2 illustrates a process for adapting spectrum sharing protocols according to an embodiment of the invention.

FIG. 2 illustrates a process for performing adaptation between different spectrum sharing protocols. The process may be carried out in a spectrum sharing adaptation system arranged between the MFCN and a resource manager of the spectrum sharing system 120. Referring to FIG. 2, the method comprises: performing (block 200), by a spectrum sharing adaptation system, allocation and transmission authorization of a shared spectrum resource to a network element of a communication network, wherein the shared spectrum resource is on frequencies not exclusively licensed to the communication network, and wherein the spectrum sharing adaptation system allocates the shared spectrum resource to the network element by using a first spectrum sharing protocol; acquiring (block 202), by the spectrum sharing adaptation system, allocation and transmission authorization of the shared spectrum resource from a spectrum resource manager managing utilization of spectrum resources, wherein the spectrum sharing adaptation system acquires the allocation of the shared spectrum resource by using a second spectrum sharing protocol different from the first spectrum sharing protocol; and performing (block 204), by the spectrum sharing adaptation system, adaptation between the first spectrum sharing protocol and the second spectrum sharing protocol.

The process shown in FIG. 2 is started when an event of the first or second spectrum sharing protocol initiates the spectrum resource allocation. Depending on the sharing protocol and regulatory rules, the sequence of the illustrated blocks 200, 202, and 204 may thus be changed and block 204 may be embedded into block 200 and/or 202. This feature is also represented by providing the blocks 200 and 202 inside block 210. Block 210 may be considered as a step for mediating spectrum resource allocation and transmission authorization between the spectrum resource manager and the network element. Block 210 may include also block 204. Block 204 may include processing and adapting spectrum resource information generated in the negotiation of one of blocks 200 and 202, and generating respective results of the adapting for use in the negotiation of the other one of blocks 200 and 202. Some embodiments of the adaptation of the spectrum resource information are discussed below.

In an embodiment, the communication network is the MFCN.

In an embodiment, the adaptation comprises at least one of the following operations: performing a message format conversion between the first spectrum sharing protocol and the second spectrum sharing protocol, modifying an address space of the network element between the first spectrum sharing protocol and the second spectrum sharing protocol, modifying at least one spectrum sharing rule of the shared spectrum resource between the first spectrum sharing protocol and the second spectrum sharing protocol.

In an embodiment, the adaptation comprises by the spectrum sharing adaptation system: receiving, from the spectrum resource manager, a first message indicating the shared spectrum resource allocated to the apparatus arrangement; modifying the allocation of the shared spectrum resource; and transmitting, to the network element, a second message indicating the modified allocation of the shared spectrum.

Detailed embodiments of the adaptation are described below.

In an embodiment, the allocation of the shared spectrum resource and transmission authorization of the shared spectrum resource are separate processes and considered separately by the spectrum sharing adaptation system (block 200) and/or the spectrum resource manager (block 202). The allocation may be considered as a general grant to access the shared spectrum resource, e.g. a licensing or sub-licensing the right to access the shared spectrum resource. Separately, it may be considered when and under which conditions it is allowed to transmit in the shared spectrum resource, and this may be considered under the transmission authorization. For example, at certain times, the transmission may be prevented in order to protect the primary user or for another reason and, in such cases, the transmission authorization process may prevent the network element from transmitting in the shared spectrum resource while the allocation is still valid and maintained. When the transmission is allowed, the transmission authorization function may allow the transmission in the shared spectrum resource. In some spectrum sharing protocols, the allocation and the transmission authorization may be two distinct processes in the above-described manner. In other spectrum sharing protocols, the allocation and the transmission authorization may be combined into one process, e.g. the allocation also allows the transmission in the shared spectrum resource and no separate transmission authorization function is necessary.

The spectrum sharing adaptation system may operate as a protocol translator and as an adaptation function between the network element and the resource manager that support different spectrum sharing protocols. The network element may be an access node or a group of access nodes, for example. This enables the access node(s) to acquire spectrum resources of those primary users that are under a regulating authority or a spectrum resource manager that supports a different spectrum sharing protocol than the access node(s). By using the spectrum sharing adaptation system, the need to update the support for the various spectrum sharing protocols in the access node(s) may be avoided which reduces the costs and implementation complexity, particularly in systems encompassing large numbers of access nodes. In another embodiment, the network element is an operation and maintenance server of the MFCN.

In an embodiment, the shared frequencies may be owned, utilized, or managed by a primary user or an incumbent user. For example, LSA defines Incumbent and LSA Licensee as the primary users. However, there are other spectrum sharing protocols in operation or under development where such primary users are present temporarily or not present, and the spectrum resources may be unlicensed and shared amongst MFCNs. Embodiments described below are applicable to all spectrum sharing protocols, although some of the embodiments may mention the presence of the primary user.

In an embodiment, the spectrum sharing adaptation system operates as a protocol translator that translates a message format of one spectrum sharing protocol to a message format of another spectrum sharing protocol before forwarding a message between the access node(s) and the spectrum resource manager. For example, the spectrum sharing adaptation system may translate the resource request to a message format of the second spectrum sharing protocol before forwarding the resource request to the spectrum resource manager. Similarly, the spectrum sharing adaptation system may translate the resource availability message to a format of the first spectrum sharing protocol before transmitting the resource availability message to the access node(s).

In another embodiment, the spectrum sharing adaptation system modifies the contents of the messages between the spectrum resource manager and the access node(s) in the adaptation. For example, upon receiving the resource availability message indicating the available spectrum resource, the available resource utilization may be defined by rules provided according to the second spectrum sharing protocol. The spectrum sharing adaptation system may complement the rules by adding further sharing rules defined without invalidating or overruling the original rules. For example, the spectrum resource manager may specify that the spectrum resource utilization shall impose no interference towards the primary users. The spectrum sharing adaptation system may implement the rules by first specifying a transmission power limit, e.g. a maximum emitted interference power, and then determining whether or not the MFCN requesting for the spectrum resource is capable of operating below the transmission power limit specified for the available spectrum resource. If the spectrum sharing adaptation system determines that the MFCN is capable of meeting the emitted power limitations, the available spectrum resource may be allocated to the MFCN. Otherwise, the spectrum sharing adaptation system may search for another spectrum resource for which the MFCN is capable of meeting the requirements.

In an embodiment, the spectrum sharing adaptation system perform an identifier conversion between the spectrum sharing protocols. For example, the spectrum sharing protocols may employ different lengths for identifiers, and the spectrum sharing adaptation system may perform adaptation between the identifier. In an embodiment, the network element(s) are identified by using an 8-digit identifier while the spectrum resource manager requires 16-digit identifiers. The spectrum sharing adaptation system may communicate over the first spectrum sharing protocol by using one identifier format and over the second spectrum sharing protocol by using another identifier format.

The spectrum sharing adaptation system may also define new rules such as access priorities for different access nodes or MFCNs. The new rules may, however, be secondary to the rules of the spectrum resource manager. For example, let us consider a case where two MFCNs request need a spectrum resource of a primary user, a first MFCN has a higher priority in the allocation while a second MFCN has a lower priority. While the first MFCN has the priority over the second MFCN, if the first MFCN cannot comply with the limitations imposed on an available spectrum resource, the available spectrum resource is allocated to the second MFCN. This is an example where a further rule defined by the spectrum sharing adaptation system cannot overrule the rules imposed by the spectrum resource manager.

Figure 3:
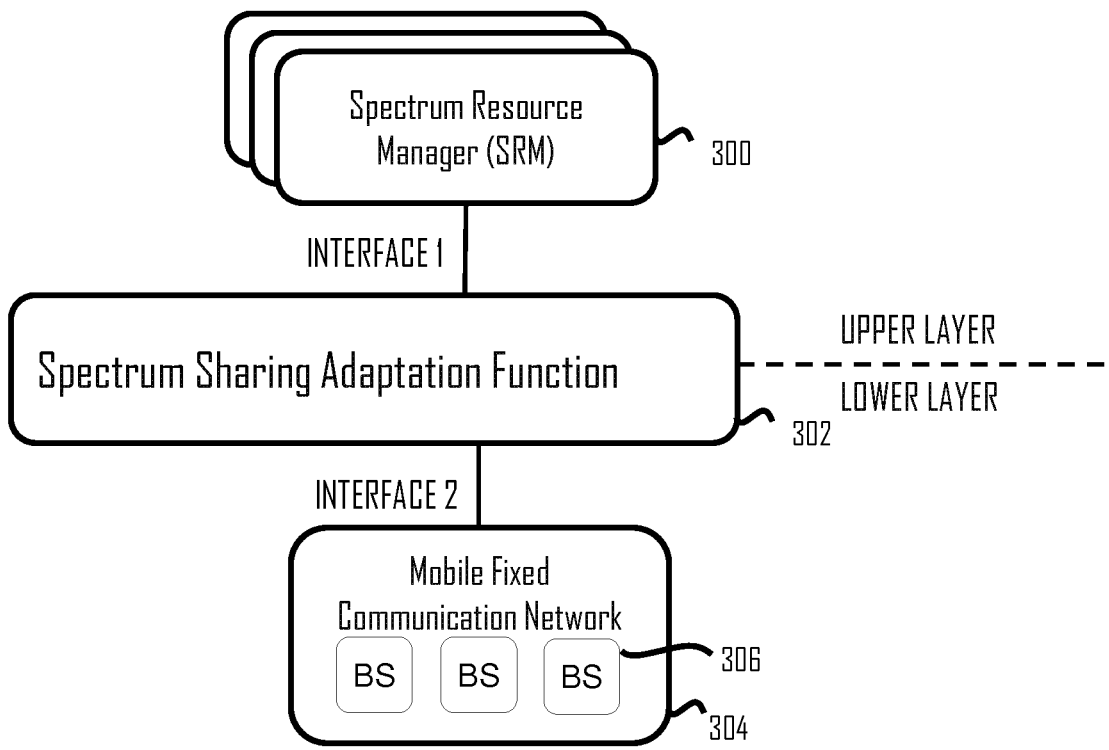
FIGS. 3 and 4 illustrate embodiments of a spectrum sharing adaptation function.

FIG. 3 illustrates an architecture comprising the spectrum sharing adaptation system 302. The spectrum sharing system may be an apparatus or a system comprising at least one processor for processing the messages, a first communication interface (interface 1) configured to provide a communication connection with the spectrum resource manager 300, and a second communication interface (interface 2) configured to provide a communication connection with the access nodes or base stations (BS) 306 of the MFCN 304. Considering the above-described hierarchy where the spectrum resource manager allocates the spectrum resources of the primary user and defines any limitations to the utilization, e.g. time restrictions, location-based restrictions, and/or transmission power restrictions, and the MFCN then utilizes the spectrum resources under these limitations, the spectrum resource manager may form an upper layer and the MFCN a lower layer in a hierarchy. The spectrum sharing adaptation system 302 may be arranged between the layers as a mediating entity.

As illustrated in FIG. 3, the number of spectrum sharing adaptation system may connect to multiple spectrum resource managers, wherein at least some of the spectrum resource managers support mutually different spectrum sharing protocols. The first communication interface may be considered as a multi-protocol interface providing the spectrum sharing adaptation system 302 with capability of supporting multiple spectrum sharing protocols in the first communication interface. Accordingly, the MFCN may support only one spectrum sharing protocol and still acquire spectrum resources of multiple different primary users supporting spectrum sharing protocols not supported by the MFCN.

Figure 4:
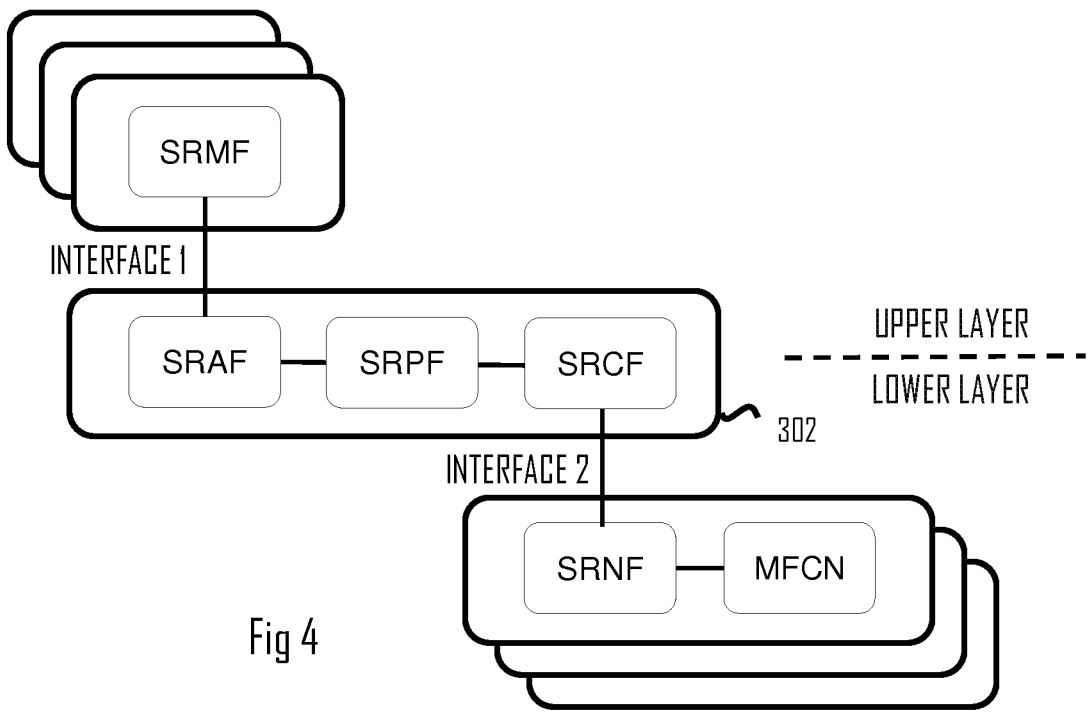

FIG. 4 illustrates the structure of the spectrum sharing adaptation system (SSAS) 302 in greater detail. The SSAS 302 may comprise a spectrum resource authorization function (SRAF), which handles the upper layer and the second spectrum sharing protocol towards the spectrum resource manager, a spectrum resource processing function (SRPF) which performs the adaptation between upper layer and the lower layer, and a spectrum resource coordination function (SRCF) which handles the lower layer and the first spectrum sharing protocol. The three functions of the SSAS can be logically combined or each function may act independently and in any combination to allow flexible building of multi-function blocks for upper layer or lower layer. For example, the SRPF and SRCF may be arranged to form a spectrum access system (SAS) for the lower layer (the MFCN) which allocates spectrum resources indicated by the upper layer through one or more spectrum sharing protocols. The MFCN may include or be connected to a spectrum resource network function (SRNF) configured to acquire the spectrum resources of the primary users for the MFCN by using the first spectrum sharing protocol.

The spectrum resource managers may include a spectrum resource management function (SRMF) performing spectrum sharing tasks according to the definitions of the supported spectrum sharing protocol. For example, LSA may use a LSA Repository (LR) as the SRMF while CBRS may uses a Spectrum Access System (SAS). Both require different protocols and information elements to provide shared spectrum resource information.

The SRAF may carry out communication over the first communication interface by using message formats specified for communication with each SRMF. The SRAF may be configured to carry out an authentication procedure towards the SRMF to authenticate the SSAS as a licensee of the frequency spectrum. The SRAF may be configured to perform an authorization procedure towards the SRMF to indicate authorization to operate on the shared frequencies of the primary user(s). The SRAF may also forward messages between the SRMF and the SRPF and, in some embodiments, modify contents of the messages before sending it to the SRPF or the SRMF.

The SRCF may carry out communication over the second communication interface by using message formats specified for communication with each MFCN. The SRCF may be configured to carry out an authentication procedure towards the MFCN to authenticate the access node(s) of the MFCN. The SRCF may be configured to perform an authorization procedure towards the MFCN to determine whether or not the access node(s) requesting for spectrum resources are authorized to operate on the shared frequencies of the primary user(s) that are available and that meet the specifications of the resource request. The SRCF may also forward messages between the MFCN and the SRPF and, in some embodiments, modify contents of the messages before sending it to the SRPF or the MFCN.

By using the SSAS, the SSAS may be the representative of the MFCN towards the SRMF and, accordingly, information on the access nodes is not necessary to be exposed to the SRMF. For example, the LSA allows such a procedure regarding the authentication where the SSAS may operate as an LSA Controller authenticated towards the LSA spectrum resource manager. In another example, the SSAS communicating with the access node(s) may hide the access node(s) from the spectrum resource manager by using an identifier of an operator of the MFCN in communication with the spectrum resource manager.

In an embodiment, the SSAS is an element of the MFCN.

In another embodiment, the SSAS is external to the MFCN. The SSAS may be, for example, a spectrum resource broker for one or a plurality of MFCNs.

The SRPF may control the operation of the SSAS. For example, the SRPF may trigger SRAF actions for authentication, authorization, and message exchange with the SRMF. The SRPF may modify the contents of the information received from the SRMF before transmitting the information towards the MFCN and/or information received from the MFCN before transmitting the information towards the SRMF. The SRPF may perform spectrum resource allocation to the MFCN on the basis of spectrum resource availability information received from the SRMF. The SRPF may manage and control spectrum resource usage for MFCNs based on MFCN requests, authorization information received from the MFCN, spectrum resource protection information received from the SRMF, inter-MFCN interference protection information, and further policy rules, e.g. to guarantee fair and equal use of spectrum resources. When a spectrum resource is no longer needed in the MFCN, the MFCN may trigger the SRNF to release the respective spectrum resource.

The allocation, management, and release of spectrum resources by the SRPF depends on the spectrum sharing method defined for the lower layer and may be additionally influenced by the spectrum sharing method defined for the upper layer. For example, if a given spectrum resource is used in the MFCN and the SRMF resets the availability of this spectrum resource, the SRPF may receive the information through the SRAF and control the SRCF to inform the SRNF about the new availability of the spectrum resource. The SRNF is then responsible to initiate the actions needed to utilize the new availability of the spectrum resource in the MFCN. The SRNF may be implemented in each access node of the In summary, SRMF in the upper layer may perform a regulatory part specified by the regulating authority, while the SRNF and the MFCN on the lower layer may utilize shared spectrum resources according to a spectrum sharing protocol which is independent from the spectrum sharing protocols defined by the SRMF. The decision if a spectrum resource indicated as availably by the upper layer may be assigned to a MFCN at the lower layer, if the SRPF determines that the MFCN is applicable to utilize the spectrum resource. The determining may include regulatory information provided by the upper layer (e.g. licensee information) and respective registration information provided by the lower layer, e.g. the authorization. The regulatory information and registration information enables the SRPF to assign respective regulatory restrictions and license terms to an operator of the MFCN.

In an embodiment, the first and second spectrum sharing protocols impose different requirements to the information exchange. For example, one of the first spectrum sharing protocol and the second spectrum sharing protocol may require synchronous information exchange and the other one of the first spectrum sharing protocol and the second spectrum sharing protocol may require asynchronous information exchange. The SSAS may in such situations perform adaptations between the different requirements.

Figure 5:
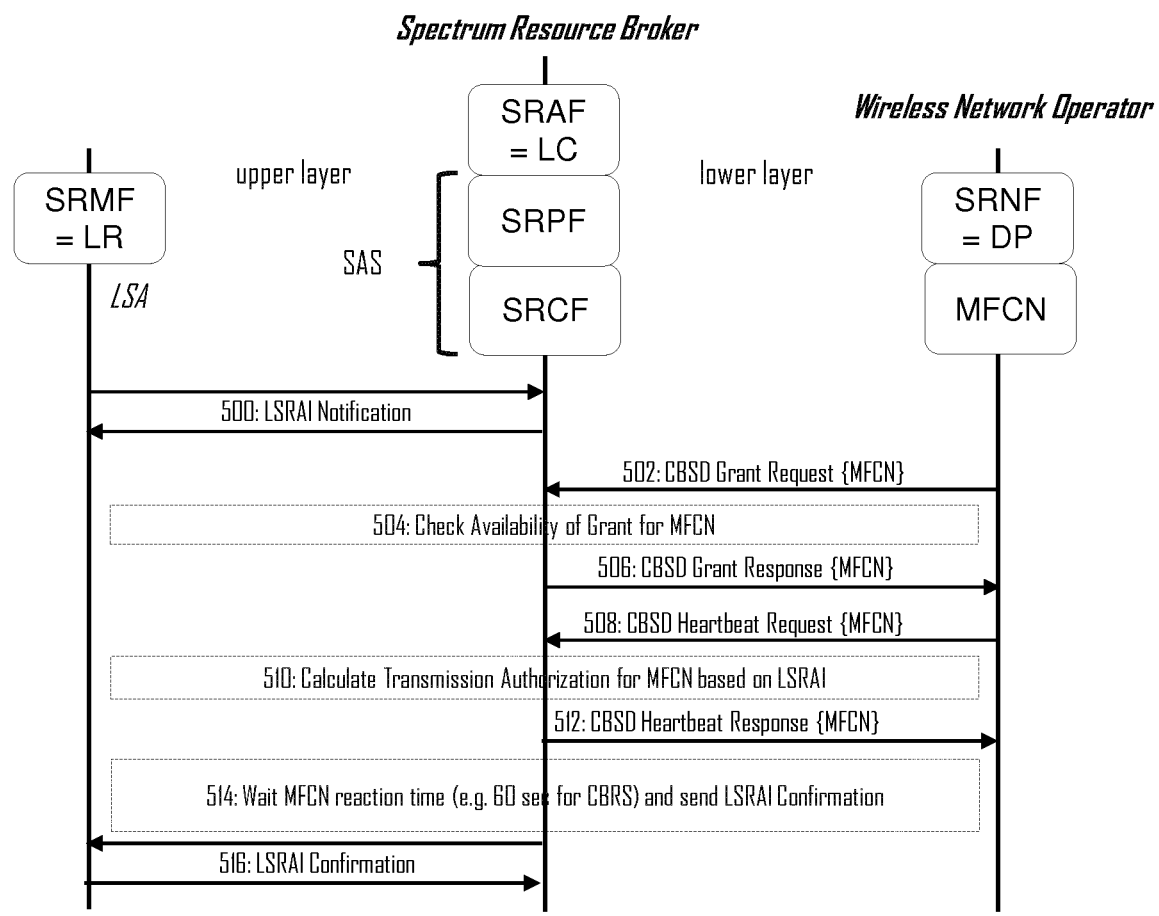
FIGS. 5 and 6 illustrate signaling diagrams for assigning spectrum resources according to some embodiments of the invention.

FIG. 5 illustrates an embodiment where the spectrum sharing protocol between the SSAS (spectrum resource broker in FIG. 5) and the MFCN is the CBRS requiring synchronous information exchange and the spectrum sharing protocol between the SRMF and the SSAS is the LSA requiring asynchronous information exchange. In the embodiment of FIG. 5, the SRAF may be embodied by a LSA controller (LC) of the LSA specifications, while the SRPF and SRCG may form the SAS of the CBRS specifications. In this case, the SSAS may adapt the different needs of the CBRS and the LSA regarding the information exchange such that the SSAS buffers the information received from the SRMF to meet the asynchronous requirement. In other words, the SSAS may acquire and update the availability status of the spectrum resources as it is indicated by the SRMF. The SRNF requires prompt responses according to the synchronous information exchange, so the SSAS may respond to the requests from the SRNF by using the information on the spectrum resources the SSAS has readily available.

Referring to FIG. 5, the SRPF may receive the indication of the available spectrum resource from the SRMF in step 500. The indication may be received as LSA Spectrum Resource Availability information (LSRAI) defined in the LSA specifications. The SRPF may then update a database storing the availability status of the spectrum resource as "available". The SRPF may further store rules or limitations for using the spectrum resource in the database. In step 502, the SRNF transmits the resource request (grant request in FIG. 5) to the SRPF. Upon receiving the resource request in step 502, the SRPF may check the database for available spectrum resources in step 504. The check may include searching for a spectrum resource the MFCN and checking whether or not the MFCN (e.g. an access node or a group of access nodes) is suitable for using a spectrum resource found available. The checking may include analyzing the restrictions for the use of the spectrum resource and cross-checking corresponding characteristics of the MFCN. For example, if there is a geographical restriction involved such that the frequency is available only in a limited geographical area, the SRPF may confirm that the MFCN will operate the spectrum resource only in the limited geographical area. If the MFCN will operate the spectrum resource outside the area, the spectrum resource is deemed unsuitable for the MFCN. The SRPF may include the spectrum resource received in step 500 in the process. Upon discovering a suitable spectrum resource for the MFCN, the SRPF may allocate the spectrum resource to the MFCN and formulate a resource response (grant response in FIG. 5) and allocate the spectrum resource to the MFCN in the resource response in step 506. The SRPF may include in the resource response any limitations to the utilization of the spectrum resource, e.g. transmission power limitations. Upon receiving the resource response in step 506, the MFCN may occupy the spectrum resource according to the possible limitations involved.

The CBRS utilizes heartbeat signaling to periodically check the resource allocation and to keep the resource allocation alive. In step 508, the SRNF transmits a heartbeat request to the SSAS. Upon receiving the heartbeat request, the SRPF may check the spectrum resource(s) allocated to the MFCN for any changes (step 510). For example, if the spectrum resource has been banned by the SRMF, the SSAS may, in connection with the heartbeat signaling deliver the corresponding information to the MFCN. If there are no changes to the allocation, the SRPF may indicate the status to the MFCN in a heartbeat response in step 512. On the other hands, if there are changes to the spectrum resource availability or limitations, the SRPF may enforce such changes in connection with heartbeat signaling.

After sending the heartbeat response indicating changes, the SRPF may wait for a determined time period (e.g. 60 seconds reaction time, or in case that the connection to the MFCN is broken until the last successful sent transmission expiry timer has expired in FIG. 5) before confirming the changes to the SRAF. Now SRAF can guarantee that the LSRAI are performed in the MFCN and confirms the processed LSRAI towards the SRMF in step 516.

In the embodiment of FIG. 5, the resource availability message is received before the resource request. The SSAS may then assign the spectrum resource indicated in the resource availability message to the one or more access nodes in response to the resource request received after the resource availability message. In an embodiment where both the MFCN and the SRMF require synchronous information exchange, the SSAS may forward the resource request to the SRMF, receive the resource availability message as a response to the forwarded resource request, and forward the resource availability message to the MFCN. Meanwhile, the SSAS may perform protocol translation to the messages before forwarding. In an embodiment, the SSAS may modify the contents of the resource request and/or resource availability message before the forwarding.

The synchronous information exchange may refer to a pull method where a requesting entity requests for a resource and a responding entity allocates the resource in response to the request. The asynchronous information exchange may refer to a push method where an entity indicates an available spectrum resource, and, thereafter, another entity assumes the spectrum resource whenever a need for the resource emerges, provided that the limitations imposed on the resource are met. In some cases, spectrum sharing protocols may enable both synchronous and asynchronous information exchange, and the manner of using them may be determined by the SSAS in a given manner. In the embodiment of FIG. 5, the pull method is employed on the lower layer while the push method is employed on the upper layer. In another embodiment, both layers employ the push method and, upon receiving the resource availability message from the SRMF, the SRPF may modify the contents of the message and forward the modified resource availability message to the SRNF. The SRNF may then either accept or reject the advertised spectrum resource. The push method may thus be considered as an advertisement method where an upper layer advertises a spectrum resource, and the lower layer either accepts or rejects it. In another embodiment, both layers employ the pull method where the SRPF, upon receiving the resource request from the SRNF, requests for the corresponding spectrum resource from the SRMF. Upon receiving the requested resource from the SRMF, the SRPF may respond to the request from the SRNF.

Figure 6:
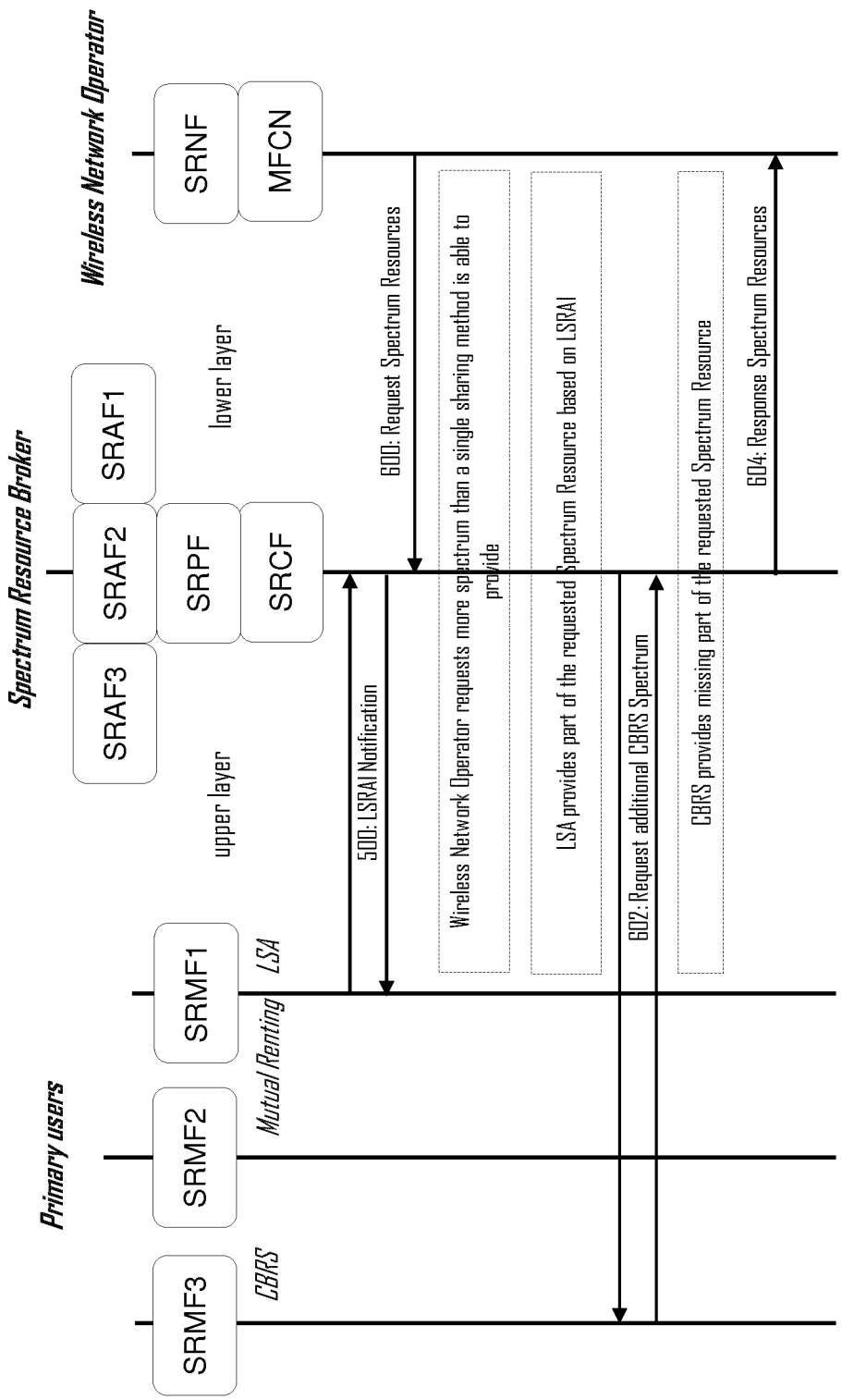

In the embodiments where the SSAS is connected to multiple spectrum resource managers, the SRPF may be configured to perform a spectrum resource allocation to the MFCN as an aggregate of spectrum resources shared by different spectrum resource managers. FIG. 6 illustrates such an embodiment. Referring to FIG. 6, the SSAS may employ multiple logically different SRAFs, one per each SRMF with which the SSAS is communicating. As illustrated in FIG. 5, each of the three SRMFs operate according to a distinct spectrum sharing protocol. One of them operates according to the LSA and may indicate the available spectrum resources in step 500 in the above-described manner.

In step 600, the SRCF may receive the resource request from the MFCN and forwards contents of the resource request to the SRPF. The SRPF may determine on the basis of the database check that there are not enough spectrum resources available to meet the demand specified in the resource request. The spectrum resource indicated in step 500 may form a part of the requested spectrum resources but more spectrum resources are needed to meet the demand. As a consequence, the SRPF may configure one or more of the SRAFs to formulate a resource request for more spectrum resource from other SRMFs than the one from which the message in step 500 was received. In step 602, the SRAF3 transmits a resource request to the SRMF3 by using the CBRS protocol. In response to the resource request, the SRAF3 receives from the SRMF3 a message indicating an available spectrum resource. The message may further specify rules for utilizing the spectrum resource. In a similar manner, the SRPF may split the size of the spectrum resource that is still needed into multiple chunks and request each chunk from a different SRMF. For example, the SRAF3 may request for a chunk from the SRMF3. Similarly, the SRAF2 may transmit a resource request to the SRMF2 by using the mutual renting protocol to request for the remaining chunk. In response to the resource request, the SRAF2 receives from the SRMF2 a message indicating an available spectrum resource that meets size of the requested chunk. Upon gathering the required spectrum resources, the SRPF may aggregate the spectrum resources and indicate the aggregated spectrum resources and, optionally, associated limitations relate to their utilization to the SRNF in step 604. Upon receiving the resource allocation in step 604, the SRNF may configure the MFCN to utilize the spectrum resources according to the optional limitations.

As described above, the SSAS may operate as the frequency broker for one or more MFCNs. The SSAS may be a licensee of the spectrum resources towards the primary users or the spectrum resource managers. Upon licensing the spectrum resources, the SSAS may then allocate the licensed spectrum resources to the MFCNs in the above-described manner. In an embodiment where a number of access nodes, of the same MFCN or of different MFCNs, may request for the same spectrum resource, e.g. a frequency channel. The access nodes may operate together as an access node set. At the lower layer, the access nodes may request for the same spectrum resource, the requests may indicate the group operation, and the SSAS may wait until all requests from the access nodes forming the group are received. Upon receiving all the requests, the SSAS may determine a spectrum resource where all the requesting access nodes can meet the rules of the spectrum resource and where all the requesting access nodes can operate. The SSAS may consider the locations of the access nodes and received rules related to the spectrum resource utilization like radio constraints from upper layer.

Figure 7:
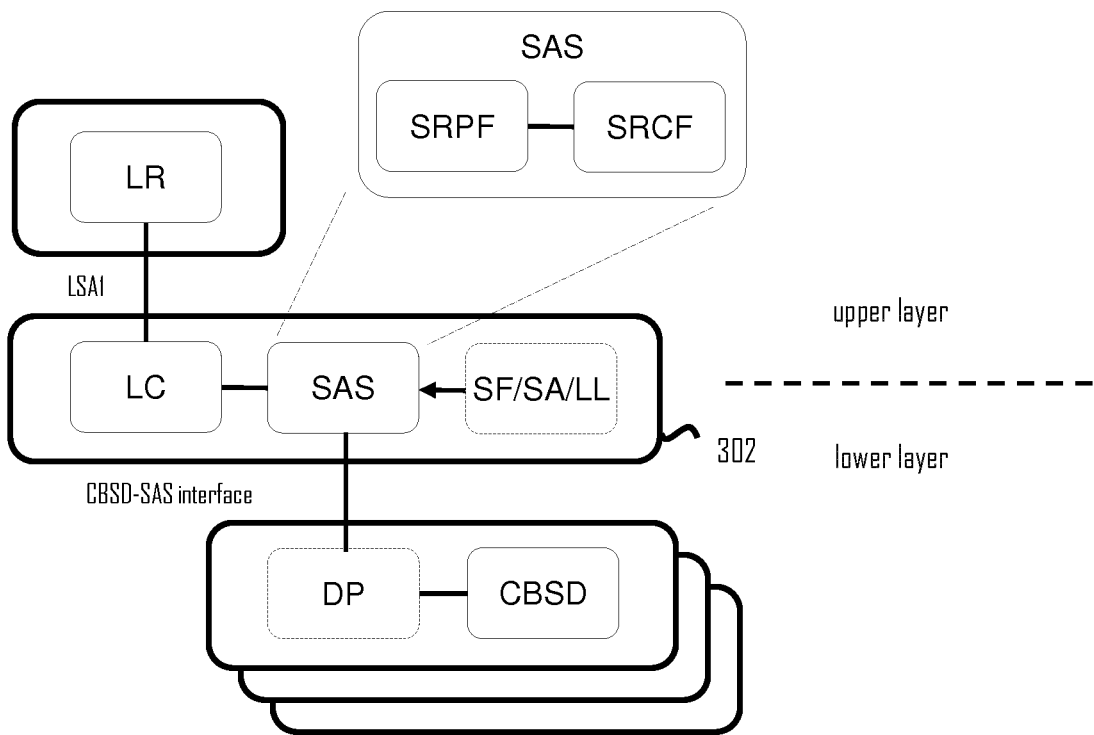
FIGS. 7 and 8 illustrate further embodiments of a spectrum sharing adaptation function.

FIG. 7 illustrates an embodiment of the SSAS enabling a CBRS Device (CBSD) to use a LSA spectrum resource without a need to support procedures and protocols of the LSA. The SSAS may act as a LSA Licensee and it may comprise a LSA Controller (LC) for operating the spectrum resources according to the LSA protocol. The LC may be connected to an LSA Repository (LR) through the first communication interface which in this case may be a LSA1 interface. The LC acts as the above-mentioned SRAF and the LR acts as the above-described SRMF. The SRPF and the SRCF form a SAS of the CBRS protocol, and they communicate with the CBSD over the second communication interface which in this case may be a CBSD-SAS interface of the CBRS protocol.

LSA spectrum resource information may in this case be acquired by the LC from the LR and output to the SRPF of the SAS. The LSA spectrum resource information may include the available spectrum resources, general protection requirements towards the primary user(s) and/or other users, sharing arrangement (SA), and a LSA License. This information may be delivered from the LR to the LC as the LSRAI. The SAS may then allocate the available spectrum resources to the CBSD upon determining that the CBSD is authorized and capable of using the spectrum resources according to the limitations defined in the LSRAI. In an embodiment, the SRCF performs an adaptation to support the standardized CBSD-SAS interface as the second interface while the SRPF performs adaptation to modify frequency or time-frequency characteristics of the available spectrum resources, for example. The SRPF may convert spectrum resource definitions of the LSRAI to ones that comply with the CBRS which may include adapting frequencies of the spectrum resource to a new frequency band structuring. As described above, the SRPF may implement different protection requirements for the spectrum resources than those imposed in the LSRAI.

The LC may provide LSRAI to the SRPF by adapting the LSA-SAS interface. Alternatively, the interface for the Environmental Sensing Capability (ESC) or a new interface as required to define a Priority Access License Protection Area (PPA) can be used between the LC and the SAS with respective adaptations as well. The ESC may refer to that sensing capability is required before transmitting in the spectrum resource in order to detect primary users and avoid interference towards the primary users. ESC detections of primary usage and PAA definitions are comparable to zone definitions used for LSRAI. The SAS or the LC may convert the zone definitions of the LSRAI to the ESC and PAA definitions. The SAS may perform for each received LSRAI new calculations for the LSA spectrum resource grants and inform the CBSD via the next resource request-response procedure or heartbeat signalling, e.g. whether the granted resource is still available and can be re-authorized or if a grant is suspended or terminated.

Figure 8:
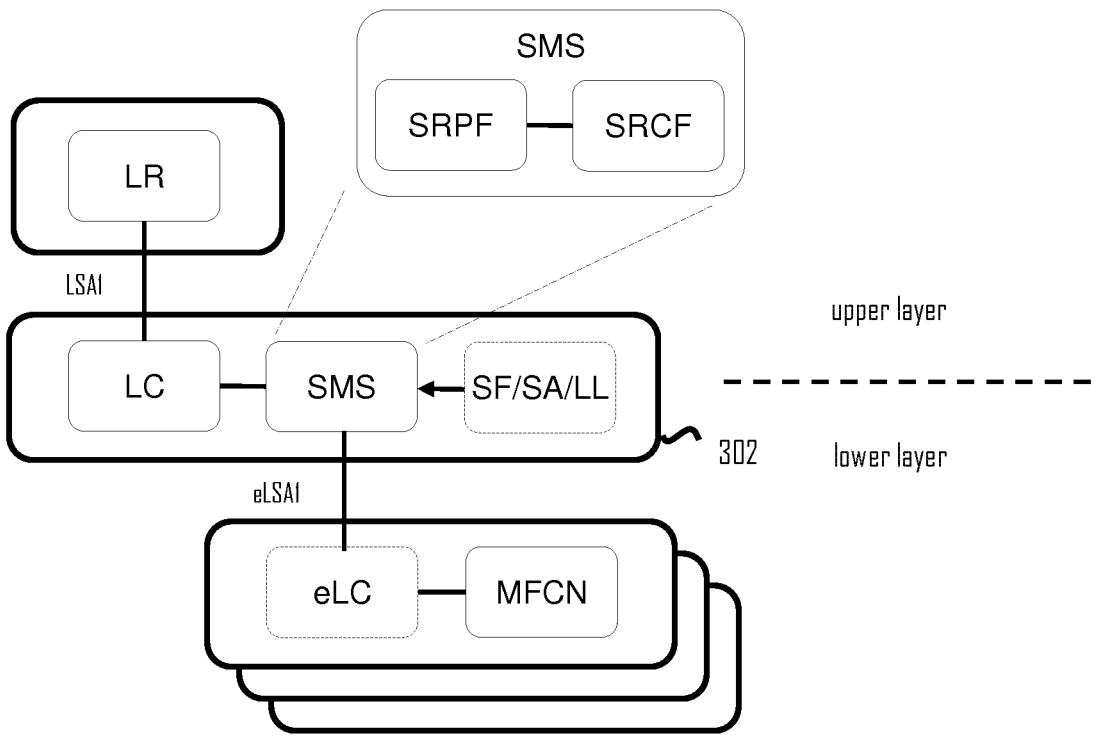

Another embodiment of the SSAS is illustrated in FIG. 8. This embodiment configures the SSAS to allow extension of the standardized LSA sharing methods so as to provide a more dynamic spectrum resource sharing via a limited LSA resource pool. Such an extension has been discussed to some degree within a METIS (Mobile and wireless communications Enablers for the Twenty-twenty Information Society 5G) project. For the extended spectrum resource sharing via a limited spectrum pool as proposed in the METIS project, a spectrum management system (SMS) is introduced. The SMS comprises the SRPF and SRCF. The SMS may handle LSA spectrum resource sharing between the primary user(s) and multiple MFCNs, communication with an extended LSA Controller (eLC) which acts on behalf of a MFCN (SRCF). The LC may provide connection to the LR over the LSA1 interface extension to support LSA spectrum resource grant and relinquishment for a MFCN, as described above. The SSAS (the LSA Licensee) operates the LC and the SMS.

LSA spectrum resource information may in this case be acquired by the LC from the LR and output to the SRPF of the SAS. The LSA spectrum resource information may include the available spectrum resources, general protection requirements towards the primary user(s) and/or other users, sharing arrangement (SA), and a LSA License. This information may be delivered from the LR to the LC as the LSRAI. The SMS performs for each received LSRAI respective calculations for the affected LSA spectrum resources according to any one of the above-described embodiments and provides the results to the MFCN via the eLC. The results contain the information if the spectrum resource is available to a requesting MFCN and when it is available the spectrum resource information together with the calculated MFCN-specific protection requirements or other limitations related to the usage of the resource. Such requirements or limitations may be derived from the LSRAI and/or determined by performing neighborhood calculations.

A MFCN can transmit at a LSA spectrum resource when the eLC (extended LC), acting as the SRNF, requests a LSA spectrum resource and the SMS responds successfully via the eLSA1 interface between eLC and the SRCF part of the SMS. A successful response may include also an expiry timer, which defines the time when a spectrum resource can no longer be used in the MFCN. Due to the privacy data protection requirements defined for LSA, each eLC acts on behalf of the respective MFCN without need to send MFCN details to the SMS. The function is implemented by sending, in the response to a resource request, the LSA spectrum resource together with associated limitations from the SRCF to the eLC. The limitations may be invalidated when the resource is either expired or the eLC decides to relinquish the spectrum resource from the utilization of the respective MFCN.

In the embodiment of FIG. 8, the SSAS may be configured to change between the push (asynchronous) and pull (synchronous) communication methods on a need basis, at least on the lower layer. Either method may have an advantage over the other depending on the type of the MFCN.

In an example use case, an industry campus hosts multiple companies that require temporary wireless services with guaranteed quality of Service (QoS). A conventional LSA method supports QoS for the LSA spectrum resources but does not support the temporary allocation of the resources. Another aspect is that the available LSA resources needs to be unique per LSA Licensee. The campus owner may utilize the spectrum broker system (SSAS) described above to act as a LSA Licensee. The SSAS may then share the licensed LSA Spectrum Resources (LSR) in the campus area. The sharing rules allows to use the LSR within the campus area as long as an incumbent is protected according to a defined protection zone. The protection of the incumbent is a sharing rule defined on the upper layer. To guarantee this protection, the SSAS may sub-lease the spectrum to the different companies at the Campus with a help of the CBRS method used at the lower layer. CBRS allows to provide a spectrum resource to one or more access nodes with additional operation parameters, e.g. a maximum effective isotropic radiated power (EIRP), which the SSAS may communicate to the one or more access nodes during the resource request/response procedure. In this manner, the SSAS may influence the unwanted emissions when the access node(s) transmit(s) with the selected operation parameters. The SSAS may consider a sum of all unwanted emissions of all access nodes using the LSR in order to fulfill the protection rule at the upper layer. The SSAS may consider all the emissions with every grant request. The SSAS may define additional sharing rules for the concurrent use of the LSR at the lower layer. An example for such a rule may be: when an access node of a higher priority user requests a resource grant with an operational parameter that violates the protection requirement from the upper layer with the current utilization of the requested spectrum resource. However, the resource may be granted when the resource utilization changes such that the protection requirement can be satisfied, e.g. as soon as a grant of the spectrum resource for an access node of a lower priority user is terminated. In this scenario, the SSAS adds rules for grants on lower layer, but the rules shall follow the protection rule of the upper layer. Depending on the selected spectrum sharing method, the rules may vary but the principle that the higher level rule is the master rule and lower layer rules needs to follow the master is always valid.

In yet another example, the SSAS may be used to simplify the licensing of spectrum on a regulatory level, e.g. the spectrum broker licenses the spectrum resource on a nation-wide area and sub-licenses the spectrum resource to a lower layer network operator as a local license within a sub-area and with a simplified sub-licensing contract.

Figure 9:
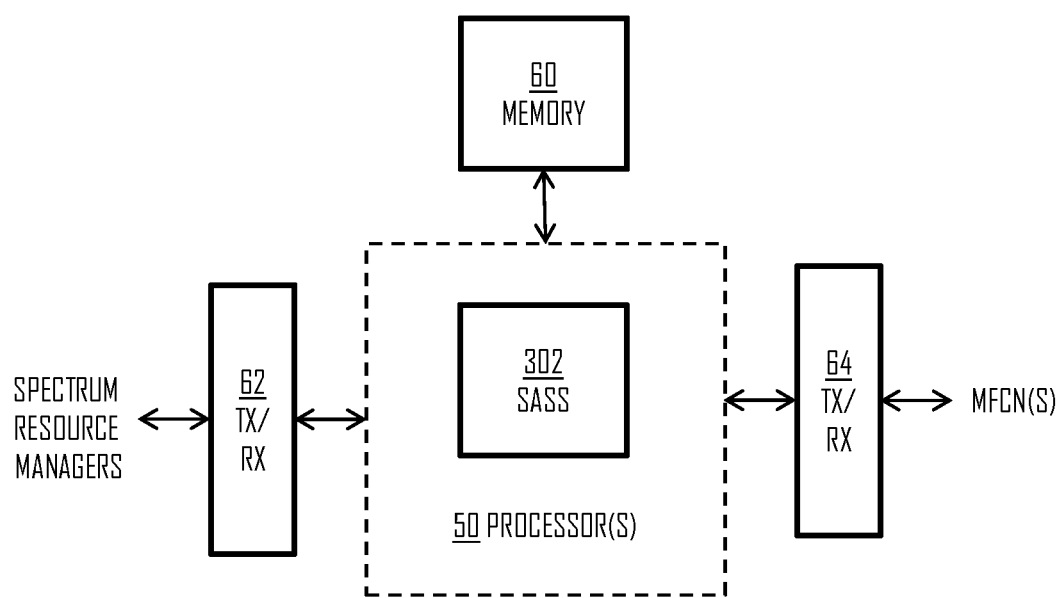
FIG. 9 illustrates a block diagram of an apparatus according to an embodiment of the invention.

FIG. 9 illustrates a block diagram of a system according to an embodiment of the invention. The system may be comprised in one or more server computers in the MFCN or outside the MFCN. The system may employ one or more physical or virtual servers to execute the global optimization process. Accordingly, the system may encompass a single apparatus or a system of multiple apparatuses. In other words, the system may be provided by a single processing system or a distributed processing system. From another perspective, the system may be considered as an apparatus arrangement comprising one or more apparatuses. The system or the apparatus arrangement may be, for example, one or more circuitries or one or more chipsets in such computers. The system or apparatus arrangement may comprise an electronic device comprising electronic circuitries, or multiple electronic devices.

Referring to FIG. 9, the system may comprise a processing circuitry 50 such as at least one processor, and at least one memory 60 including a computer program code (software) 62 wherein the at least one memory and the computer program code (software) are configured, with the at least one processor, to cause the system to carry out any one of the embodiments of the SSAS performing the adaptation between the spectrum sharing protocols, as described above. The computer program code may define structure of the SSAS according to any one of the embodiments of FIGS. 3, 4, 7, and 8.

The memory 60 may be implemented using any suitable data storage technology, such as semiconductor based memory devices, flash memory, magnetic memory devices and systems, optical memory devices and systems, fixed memory and removable memory. The memory may comprise a configuration database 64 for storing the information on the available spectrum resources and associated limitations.

The system may further comprise the first communication interface (I/O) 62 comprising hardware and/or software for realizing communication connectivity according to one or more spectrum sharing protocols. The communication interface 66 may provide the system with communication capabilities to communicate with the spectrum resource managers. The communication interface 62 may support multiple spectrum sharing protocols and, as a consequence, it is capable of providing a communication connection to multiple spectrum sharing managers supporting different spectrum sharing protocols.

The system may further comprise the second communication interface (I/O) 64 comprising hardware and/or software for realizing communication connectivity according to one or more spectrum sharing protocols. The communication interface 64 may provide the apparatus with communication capabilities to communicate with the MFCN(s). The communication interface 64 may support one spectrum sharing protocol, e.g. when it is an entity of the MFCN, or it may support multiple spectrum sharing protocols, e.g. when the system operates as the spectrum resource broker. In the latter case, the system is capable of providing a communication connection to multiple MFCNs supporting different spectrum sharing protocols. The communication interface 64 may, for example, provide an interface to access nodes of the MFCN(s).

The processing circuitry 50 may comprise the SSAS 302 according to any one of the above-described embodiments. The SSAS may be configured to execute the process of any one of FIGS. 5 and 6 or any one of the embodiments of the SSAS described in connection with FIGS. 2 to 8. As described above, the SSAS may employ the communication interfaces 62, 64 to communicate with the spectrum resource managers and the MFCN(s).

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 2 to 8 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method comprising:
performing, by a spectrum sharing adaptation system, allocation and transmission authorization of a shared spectrum resource to a network element of a communication network, wherein the shared spectrum resource is on frequencies not exclusively licensed to the communication network, and wherein the spectrum sharing adaptation system allocates the shared spectrum resource to the network element by using a first spectrum sharing protocol;
acquiring, by the spectrum sharing adaptation system, allocation and transmission authorization of the shared spectrum resource from a spectrum resource manager managing utilization of spectrum resources, wherein the spectrum sharing adaptation system acquires the allocation of the shared spectrum resource by using a second spectrum sharing protocol different from the first spectrum sharing protocol; and performing, by the spectrum sharing adaptation system, adaptation between the first spectrum sharing protocol and the second spectrum sharing protocol, wherein one of the first spectrum sharing protocol and the second spectrum sharing protocol requires synchronous information exchange and the other one of the first spectrum sharing protocol and the second spectrum sharing protocol requires asynchronous information exchange, said performing the adaptation comprising adapting the synchronous information change to the asynchronous information change by buffering at least one message received over the synchronous information change until it can be transmitted over the asynchronous information change.

2. The method of claim 1, wherein said performing the adaptation comprises:

modifying the specifications of the spectrum resource acquired from the spectrum resource manager to comply with the first spectrum sharing protocol; and transmitting the modified specifications of the spectrum resource to the network element over the first spectrum sharing protocol.

3. The method of claim 1, wherein the spectrum sharing adaptation system operates as a spectrum licensee for the communication network, the method further comprising as performed by the spectrum sharing adaptation system:

verifying authenticity of the network element and authorization of the network element to access the requested spectrum resources; and authenticating the spectrum sharing adaptation system towards the spectrum resource manager as said spectrum licensee.

4. The method of claim 1, wherein the spectrum sharing adaptation system operates as a spectrum broker for a plurality of communication networks of different operators.

5. The method of claim 1, further comprising, as performed by the spectrum sharing adaptation system:

determining that the spectrum resource negotiated with the spectrum resource broker is smaller than a need of the network element for spectrum resources;

in response to said determining, acquiring more spectrum resources from a second spectrum resource manager different from said spectrum resource manager and managing utilization of frequencies according to a third spectrum sharing protocol different from the second spectrum sharing protocol; and forming the spectrum resources for the network element from the spectrum resources negotiated with the spectrum resource manager and from the spectrum resources acquired from the second spectrum resource manager.

6. The method of claim 5, wherein the third spectrum sharing protocol is different from the first spectrum sharing protocol.

7. The method of claim 1, wherein the negotiating with the network element is based on a request-response procedure where the network element requests for the spectrum resource, and wherein the negotiating with the spectrum resource broker is based on a push method where the spectrum resource manager autonomously indicates an available spectrum resource to the spectrum sharing adaptation system, and the spectrum sharing adaptation system accepts the indicated spectrum resource upon determining to accept the allocation of the spectrum resource.

8. The method of claim 1, wherein said performing the adaptation comprises at least one of the following: performing a message format conversion between the first spectrum sharing protocol and the second spectrum sharing protocol, modifying an address space of the network element between the first spectrum sharing protocol and the second spectrum sharing protocol, modifying at least one spectrum sharing rule of the shared spectrum resource between the first spectrum sharing protocol and the second spectrum sharing protocol.

9. The method of claim 1, wherein the spectrum sharing adaptation system is an element of the communication network.

10. An apparatus arrangement, comprising:

at least one processor, and at least one memory including a computer program code, wherein the at least one memory and the computer program code are configured, with the at least one processor, to cause the apparatus arrangement to:

perform allocation and transmission authorization of a shared spectrum resource to a network element of a communication network, wherein the shared spectrum resource is on frequencies not exclusively licensed to the communication network, and wherein the apparatus arrangement allocates the shared spectrum resource to the network element by using a first spectrum sharing protocol;

acquire allocation and transmission authorization of the shared spectrum resource from a spectrum resource manager managing utilization of spectrum resources, wherein the apparatus arrangement acquires the allocation of the shared spectrum resource by using a second spectrum sharing protocol different from the first spectrum sharing protocol; and perform adaptation between the first spectrum sharing protocol and the second spectrum sharing protocol, wherein one of the first spectrum sharing protocol and the second spectrum sharing protocol requires synchronous information exchange and the other one of the first spectrum sharing protocol and the second spectrum sharing protocol requires asynchronous information exchange, wherein the at least one memory and the computer program code are configured, with the at least one processor, to cause the apparatus arrangement to perform the adaptation by at least adapting the synchronous information change to the asynchronous information change by buffering at least one message received over the synchronous information change until it can be transmitted over the asynchronous information change.

11. The apparatus arrangement of claim 10, wherein the at least one memory and the computer program code are configured, with the at least one processor, to cause the apparatus arrangement to perform the adaptation by performing at least the following:

modifying the specifications of the spectrum resource negotiated with the spectrum resource manager to comply with the first spectrum sharing protocol; and transmitting the modified specifications of the spectrum resource to the network element over the first spectrum sharing protocol.

12. The apparatus arrangement of claim 10, wherein the apparatus arrangement operates as a spectrum licensee for the communication network, and wherein the at least one memory and the computer program code are configured, with the at least one processor, to cause the apparatus arrangement to:

verify authenticity of the network element and authorization of the network element to access the requested spectrum resources; and authenticate the system towards the spectrum resource manager as said spectrum licensee.

13. The apparatus arrangement of claim 10, wherein the apparatus arrangement operates as a spectrum broker for a plurality of communication networks of different operators.

14. The apparatus arrangement of claim 10, wherein the at least one memory and the computer program code are configured, with the at least one processor, to cause the apparatus arrangement to:

determine that the spectrum resource negotiated with the spectrum resource broker is smaller than a need of the network element for spectrum resources;

in response to said determining, acquire more spectrum resources from a second spectrum resource manager different from said spectrum resource manager and managing utilization of frequencies according to a third spectrum sharing protocol different from the second spectrum sharing protocol; and form the spectrum resources for the network element from the spectrum resources negotiated with the spectrum resource manager and from the spectrum resources acquired from the second spectrum resource manager.

15. The apparatus arrangement of claim 14, wherein the third spectrum sharing protocol is different from the first spectrum sharing protocol.

16. The apparatus arrangement of claim 10, wherein the at least one memory and the computer program code are configured, with the at least one processor, to cause the apparatus arrangement to perform the negotiation with the network element as based on a request-response procedure where the network element requests for the spectrum resource, and to perform the negotiation with the spectrum resource broker as based on a push method where the spectrum resource manager autonomously indicates an available spectrum resource to the apparatus arrangement, and the apparatus arrangement accepts the indicated spectrum resource upon determining to accept the allocation of the spectrum resource.

17. The apparatus arrangement of claim 10, wherein the one of the first spectrum sharing protocol and second spectrum sharing protocol is one of Licensed Shared Access, LSA, and Citizens Broadband Radio Service, CBRS, and wherein the other one of the first spectrum sharing protocol and second spectrum sharing protocol is the other one of the LSA and CBRS.

18. The apparatus arrangement of claim 10, wherein the at least one memory and the computer program code are configured, with the at least one processor, to cause the apparatus arrangement to perform said adaptation by:

receiving, from the spectrum resource manager, a first message indicating the shared spectrum resource allocated to the apparatus arrangement;

modifying the allocation of the shared spectrum resource; and transmitting, to the network element, a second message indicating the modified allocation of the shared spectrum.

19. A computer program product embodied on a non-transitory transmission medium readable by a computer and, when executed by the computer, configured to cause the computer to execute a computer process comprising:

performing, by a spectrum sharing adaptation system, allocation and transmission authorization of a shared spectrum resource to a network element of a communication network, wherein the shared spectrum resource is on frequencies not exclusively licensed to the communication network, and wherein the spectrum sharing adaptation system allocates the shared spectrum resource to the network element by using a first spectrum sharing protocol of a first sharing method;

acquiring, by the spectrum sharing adaptation system, allocation and transmission authorization of the shared spectrum resource from a spectrum resource manager managing utilization of spectrum resources, wherein the spectrum sharing adaptation system acquires the allocation of the shared spectrum resource by using a second spectrum sharing protocol of a second sharing method that is different from the first sharing method; and performing, by the spectrum sharing adaptation system, adaptation between the first spectrum sharing protocol and the second spectrum sharing protocol, wherein one of the first spectrum sharing protocol and the second spectrum sharing protocol requires synchronous information exchange and the other one of the first spectrum sharing protocol and the second spectrum sharing protocol requires asynchronous information exchange, said performing the adaptation comprising adapting the synchronous information change to the asynchronous information change by buffering at least one message received over the synchronous information change until it can be transmitted over the asynchronous information change.

\* \* \* \* \*